(12) United States Patent
Sherman et al.

(10) Patent No.: US 7,807,754 B2
(45) Date of Patent: Oct. 5, 2010

(54) DRY APPLY ADHESIVE GRAPHIC FILMS

(75) Inventors: Audrey A. Sherman, St. Paul, MN (US);
David J. Yarusso, Shoreview, MN (US);
Frank T. Sher, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 765 days.

(21) Appl. No.: 11/374,236

(22) Filed: Mar. 13, 2006

(65) Prior Publication Data

US 2007/0213463 A1 Sep. 13, 2007

(51) Int. Cl.
*C08L 33/08* (2006.01)
*C08L 43/04* (2006.01)

(52) U.S. Cl. ...................... 525/209; 428/500
(58) Field of Classification Search ................. 525/209; 428/500
See application file for complete search history.

(56) References Cited

U.S. PATENT DOCUMENTS

| | | | |
|---|---|---|---|
| 3,786,116 A | 1/1974 | Milkovich et al. | |
| 3,842,059 A | 10/1974 | Milkovich et al. | |
| 4,693,935 A | 9/1987 | Mazurek | |
| 5,141,790 A | 8/1992 | Calhoun et al. | |
| 5,296,277 A | 3/1994 | Wilson et al. | |
| 5,362,516 A | 11/1994 | Wilson et al. | |
| 5,650,215 A | 7/1997 | Mazurek | |
| 6,123,890 A | 9/2000 | Mazurek et al. | |
| 6,197,397 B1 | 3/2001 | Sher et al. | |
| 6,472,065 B1 | 10/2002 | Alahapperuma | |
| 6,630,239 B2 | 10/2003 | Cernohous | |

FOREIGN PATENT DOCUMENTS

JP 01-256580 10/1989

OTHER PUBLICATIONS

Y. Kawakami et al., "Silicone Macromers for Graft Polymer Synthesis," Polymer Journal, vol. 14, No. 11, pp. 913-917, 1982.
Y. Kawakami et al., "Synthesis of Silicone Graft Polymers and a Study of Their Surface Active Properties," Makromol. Chem., 185, pp. 9-18, 1984.
Y. Kawakami et al., "Synthesis and Copolymerization of Polysiloxane Macromers," pp. 245-246, date unknown.
U.S. Appl. No. 10/940,442, "Optical Film," Sherman et al., filed Sep. 14, 2004.

*Primary Examiner*—Kuo-Liang Peng
(74) *Attorney, Agent, or Firm*—Colene H. Blank

(57) ABSTRACT

An adhesive composition includes a blend of a pressure sensitive adhesive and an additive. The pressure sensitive adhesive includes a (meth)acrylate polymer. The additive includes a copolymer with a vinyl polymeric backbone that includes at least one free radically polymerizable vinyl monomer A and at least one reinforcing comonomer B, wherein B is present at 0 to about 20% by weight of the copolymer, and a pendant polysiloxane monomer grafted to the backbone. The adhesive composition may optionally be crosslinked. The adhesive composition may be applied to a film to form a graphic article. These graphic articles may be applied to a substrate without liquid application aids.

7 Claims, 1 Drawing Sheet

DRY APPLY ADHESIVE GRAPHIC FILMS

BACKGROUND

This disclosure relates to adhesive-backed graphic articles. More particularly, this disclosure relates to large format adhesive-backed graphic articles that may be used, for example, to make backlit signs.

Large-format graphic articles, which typically include a thin polymeric film backed by a pressure sensitive adhesive, may be difficult to handle and apply onto a surface of a substrate. During the application process the thin polymeric film may fold and stick onto itself, or the adhesive may prematurely adhere to the surface of the substrate.

The adhesive-backed graphic articles may be applied onto a surface of a plastic sign substrate to make a backlit sign. The graphic article may be applied onto the surface of the plastic sign substrate by spraying a liquid, typically a water/surfactant solution, onto the adhesive side of the graphic, and optionally onto the substrate surface. The liquid temporarily "detackifies" the pressure sensitive adhesive so the installer may handle, slide, and re-position the graphic article into a desired position on the substrate surface. The liquid also allows the installer to pull the graphic article apart if it sticks to itself or prematurely adheres to the surface of the substrate. Applying a liquid to the adhesive may also improve the appearance of the installed graphic by providing a smooth, bubble free appearance with good adhesion build on the surface of the substrate.

SUMMARY

While applying a liquid and/or a surfactant solution to the adhesive on a graphic article may in some respects provide a more convenient installation, the liquid also makes installing a graphic article a rather messy process. In addition, if the graphic article is applied to, for example, a plastic substrate to make a sign, the substrate retains moisture after the installation process is complete. This retained moisture requires air drying for an extended period, typically at least one day, before the sign may be rolled up, thermoformed, or otherwise used. The retained moisture may also increase outgassing from some polymeric materials commonly used in backlit signage applications such as, for example, polycarbonates. This outgassing may cause formation of bubbles beneath the graphic article, which makes the sign less attractive to the viewer.

In one embodiment, this disclosure is directed to an adhesive composition including a blend of a pressure sensitive adhesive and an additive. The pressure sensitive adhesive includes a (meth)acrylate polymer. The additive includes a copolymer with a vinyl polymeric backbone that includes at least one free radically polymerizable vinyl monomer A and at least one reinforcing comonomer B, wherein B is present at 0 to about 20% by weight of the copolymer, and a pendant polysiloxane monomer grafted to the backbone. The polysiloxane monomer is present at 0.01 to 50% by weight of the copolymer and has a number average molecular weight of 500 to 50,000. The blend includes less than 1% by weight of the polysiloxane monomer.

In another embodiment, this disclosure is directed to an adhesive composition including a blend of a pressure sensitive adhesive, an additive and a crosslinker. The pressure sensitive adhesive includes a (meth)acrylate polymer. The additive includes a copolymer with a vinyl polymeric backbone including at least one free radically polymerizable vinyl monomer A and at least one reinforcing comonomer B, wherein B is present at 0 to about 20% by weight of the copolymer, and a pendant polysiloxane monomer grafted to the backbone. The polysiloxane monomer is present at 0.01 to 50% by weight of the copolymer, and has a number average molecular weight of 500 to 50,000.

In another embodiment, this disclosure is directed to an article including a polymeric film having thereon a layer of an adhesive composition. The adhesive composition includes a blend of an adhesive and an additive. The adhesive includes a (meth)acrylate polymer. The additive includes a copolymer with a vinyl polymeric backbone having a at least one free radically polymerizable vinyl monomer A and at least one reinforcing comonomer B, wherein B is present at up to about 20% by weight of the copolymer, and a pendant polysiloxane monomer grafted to the backbone. The polysiloxane monomer is present at 0.01 to 50% by weight of the copolymer has a number average molecular weight of 500 to 50,000.

In another embodiment, this disclosure is directed to a graphic article including an imageable polymeric film and a layer of adhesive on the film. The layer of adhesive includes a blend of a pressure sensitive adhesive and up to 50% by weight of an additive. The pressure sensitive adhesive includes a (meth)acrylate polymer. The additive includes a polysiloxane monomer with a number average molecular weight of 500 to 50,000. A release liner is on the layer of adhesive, and the release liner has a microstructured surface adjacent to the layer of adhesive.

In yet another embodiment, this disclosure is directed to a method of applying a graphic article to a substrate. The method includes providing a graphic article that includes an imageable polymeric film and a layer of an adhesive on the film. The adhesive includes a blend of a pressure sensitive adhesive and an additive. The pressure sensitive adhesive includes a (meth)acrylate polymer, and the additive includes a polysiloxane monomer. A release liner resides on the layer of adhesive, wherein the release liner has a microstructured surface adjacent to the layer of adhesive. At least a portion of the release liner is removed, and a surface of the layer of adhesive is adhered to a surface of a substrate. The surface of the adhesive layer and the surface of the substrate are dry.

In another embodiment, this disclosure is directed to a sign including a transparent or translucent substrate, an adhesive layer on the substrate, and an imageable polymeric film on the adhesive layer. The adhesive layer includes a blend of a pressure sensitive adhesive and an additive. The pressure sensitive adhesive includes a (meth)acrylate polymer, and the additive includes a polysiloxane monomer. The adhesive layer has a microstructured surface.

It is not necessary for an installer to wet these graphic articles prior to applying them on a surface of a substrate. During a dry installation process, the graphic articles described in this disclosure may be pulled apart if the film unexpectedly folds and sticks to itself. Even if installed dry, the graphic articles described herein may slide over the substrate surface and easily be moved into a precise position on the surface. The level of adhesion between the graphic article and the substrate builds more quickly than in wet applications, and the adhered graphic article may be rolled up, thermoformed, or used in any other manner without drying. The dry installation minimizes outgassing from plastics, which provides a graphic with a smooth, uniform, substantially bubble-free appearance.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention. The Figure elements are not drawn to any particular scale and individual elements' sizes are presented for ease of illustration.

DETAILED DESCRIPTION

In one aspect, the present disclosure is directed to an adhesive composition that may be used, for example, to adhere a graphic article to a surface of a substrate to form a backlit sign. The materials in the adhesive composition are selected such that the adhesive does not stick well to itself under application conditions. Therefore, if the graphic article is unexpectedly folded onto itself during installation, it may be easily pulled apart. The materials for the adhesive composition are also selected such that, during the application process, the graphic article may be temporarily removable from and repositionable on the substrate after the graphic article is applied. Materials for the adhesive composition are also selected to provide initial adhesion, wetout rate, extent of wetout and final adhesion such that the graphic article adheres well to the substrate over time and forms a sufficiently strong bond.

The adhesive composition is a blend of an adhesive including a (meth)acrylate polymer, and an additive including a copolymer with a vinyl polymeric backbone and a pendant polysiloxane monomer attached to the backbone.

The adhesive in the blend is preferably a pressure sensitive adhesive (PSA). Suitable PSAs possess properties including (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power.

The adhesive in the adhesive composition may be selected from any (meth)acrylate copolymer having the desired properties of a PSA. The (meth)acrylate copolymer is generally prepared by polymerizing (meth)acrylate monomers. Acrylate and methacrylate monomers are referred to collectively herein as "(meth)acrylate" monomers. Polymers prepared from one or more of such (meth)acrylate monomers, optionally with any one or more of a variety of other useful monomers, will be referred to collectively as "polyacrylates." The polymers can be homopolymers or copolymers, optionally in combination with other, non-(meth)acrylate, e.g., vinyl-unsaturated, monomers. Such polyacrylate polymers and their monomers are well-known in the polymer and adhesive arts, as are methods of preparing the monomers and polymers.

Such poly(meth)acrylate polymers are formed, for example, by polymerizing one or more monomeric acrylic or methacrylic esters of non-tertiary alkyl alcohols, with the alkyl groups having from 1 to about 20 carbon atoms (e.g., from 3 to 18 carbon atoms). Suitable acrylate monomers include, for example, methyl acrylate, ethyl acrylate, n-butyl acrylate, 2-methylbutyl acrylate (2-MBA), lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate. Optionally, one or more monoethylenically unsaturated co-monomers may be polymerized with the acrylate or methacrylate monomers. The particular type and amount of co-monomer is selected based upon the desired properties of the polymer.

One group of useful co-monomers includes those having a homopolymer glass transition temperature greater than the glass transition temperature of the (meth)acrylate homopolymer. Examples of suitable co-monomers falling within this group include acrylic acid, acrylamides, methacrylamides, substituted acrylamides (such as N,N-dimethyl acrylamide), itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkyl(meth)acrylates, N,N-dimethyl aminoethyl (meth)acrylate, N,N-diethylacrylamide, beta-carboxyethyl acrylate, vinyl esters of a carboxylic acid (e.g., carboxylic acids such as neodecanoic, neononanoic, neopentanoic, 2-ethylhexanoic, propionic acids, or the like), vinylidene chloride, styrene, vinyl toluene, and alkyl vinyl ethers.

A preferred adhesive in the blend includes copolymers with 98 to 90 parts by weight of 2-MBA and 2 to 10 parts by weight of acrylic acid. Another preferred adhesive in the blend includes copolymers with 98 to 90 parts by weight of isooctyl acrylate and 2 to 10 parts by weight of acrylic acid. Yet another preferred adhesive in the blend includes copolymers with 98 to 90 parts by weight of isooctyl acrylate and 2 to 10 parts by weight of acrylamide. Even another preferred adhesive in the blend include copolymers with 98 to 90 parts by weight of 2-MBA and 2 to 10 parts by weight of acrylamide.

While not wishing to be bound by any theory, it is believed that the additive in the adhesive composition includes siloxane moieties that can concentrate at a low energy surface thereof and form a siloxane-rich surface region. Once the adhesive composition is applied to a surface of a substrate, the siloxane moieties can migrate away from the siloxane-rich surface region and allow adhesion between the adhesive composition and substrate to build as the graphic article contacts the surface of the substrate over time.

The additive includes a copolymer with a vinyl polymeric backbone and a pendant polysiloxane monomer attached to the backbone. Suitable copolymer additive compositions are described in U.S. Pat. No. 4,693,935, which is incorporated by reference herein. This reference describes a composition including a copolymer having a vinyl polymeric backbone having grafted thereto pendent polysiloxane moieties. An exposed surface of these compositions is initially repositionable on a substrate to which it will be adhered but, once adhered, builds adhesion to form a strong bond.

The surface characteristics of the adhesive composition can be chemically tailored through variation of both the molecular weight of the grafted siloxane polymeric moiety and the total siloxane content (weight percentage) of the copolymer additive, with higher siloxane content and/or molecular weight providing lower initial adhesion, i.e., a greater degree of repositionability. The chemical nature and the molecular weight of the vinyl polymeric backbone of the copolymer can also be chosen such that the rate of adhesion build and the ultimate level of adhesion to the substrate can be matched to the requirements of a particular application. Longer-term repositionability may thus be achieved if so desired.

The siloxane polymeric moieties in the additive can be grafted by polymerizing a monomer onto reactive sites located on the backbone, by attaching preformed polymeric moieties to sites on the backbone, or by copolymerizing the vinyl monomer(s), A, and, when used, reinforcing monomer(s), B, with preformed polymeric siloxane monomer, C. Since the polymeric siloxane surface modifier is chemically bound, it is possible to chemically tailor the PSA compositions of this invention such that a specific degree of repositionability is provided and can be reproduced with consistency. The initial adhesion properties of even highly aggressive PSA coatings can be varied over a broad range of values in a controlled fashion, and the need for an additional process step.

The A monomer or monomers (there may be more than one) can be chosen such that a tacky or tackifiable material is obtained upon polymerization of A (or A and B). Representative examples of A monomers are the acrylic or methacrylic acid esters of non-tertiary alcohols such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, 1-hexadecanol, 1-octadecanol, and the like, the alcohols having from 1 to 18 carbon atoms with the average number of carbon atoms being about 4-12, as well as styrene, vinyl esters, vinyl chloride, vinylidene chloride, and the like. Such monomers are known in the art, and many are commercially available. In some embodiments, polymerized A monomer backbone compositions include poly(isooctyl acrylate), poly(isononyl acrylate), poly(isodecyl acrylate), poly(2-ethylhexyl acrylate), and copolymers of isooctyl acrylate, isononyl acrylate, isodecyl acrylate, or 2-ethylhexyl acrylate with other A monomer or monomers. Preferred polymerized A monomer backbone compositions include poly(isooctyl acrylate).

Representative examples of reinforcing monomer, B, are polar monomers such as acrylic acid, methacrylic acid, itaconic acid, acrylamide, methacrylamide, N,N-dimethylacrylamide, acrylonitrile, methacrylonitrile, and N-vinyl pyrrolidone. In addition, polymeric monomers or macromonomers (as will be described hereinafter) having a $T_g$ or $T_m$ above 20° C. are also useful as reinforcing monomers. Representative examples of such polymeric monomers are poly(styrene), poly(alpha-methylstyrene), poly(vinyl toluene), and poly(methyl methacrylate) macromonomers. In some embodiments, B monomers are acrylic acid, acrylamide, methacrylic acid, N-vinyl pyrrolidone, acrylonitrile, and poly(styrene) macromonomer. In illustrative embodiments, the amount by weight of B monomer does not exceed 20% of the total weight of all monomers such that excessive firmness of the PSA is avoided. In some embodiments, incorporation of B monomer to the extent of 2% to 15% by weight can provide a PSA of high cohesive or internal strength which also retains good adhesive properties. Preferred B monomers include methacrylic acid and acrylic acid.

The C monomer can have the general formula:

where X is a vinyl group copolymerizable with the A and B monomers, Y is a divalent linking group, n is zero or 1, m is an integer of from 1 to 3 such that m+n is not greater than 3; R is hydrogen, lower alkyl (e.g., methyl, ethyl, or propyl), aryl (e.g., phenyl or substituted phenyl), or alkoxy, and Z is a monovalent siloxane polymeric moiety having a number average molecular weight above about 500 and is essentially unreactive under copolymerization conditions.

The monomers are copolymerized to form the polymeric backbone with the C monomer grafted thereto and wherein the amount and composition of C monomer in the copolymer is such as to provide the PSA composition with a decrease (preferably of at least 20%) in the initial peel adhesion value relative to that of a control composition wherein the polysiloxane grafts are absent.

Copolymers containing C monomer having a molecular weight less than about 500 may be less effective in providing repositionability. Copolymers containing C monomer having a molecular weight greater than 50,000 effectively provide repositionability, but, at such high molecular weights, possible incompatibility of the C monomer with the remaining monomer during the copolymerization process may result in reduced incorporation of C. C monomer molecular weight can range from about 500 to about 50,000. In some embodiments, a molecular weight can range from about 5,000 to about 25,000.

In some embodiments, the C monomer is incorporated in the copolymer in the amount of 0.01 to 50% of the total monomer weight to obtain the desired degree of repositionability. The amount of C monomer included may vary depending upon the particular application, but incorporation of such percentages of C monomer having a molecular weight in the above-specified range has been found to proceed smoothly and to result in material which provides effective repositionability for a variety of applications while still being cost effective. In general, it is desirable to have a decrease (preferably of at least 20%) in the initial peel adhesion value relative to that of a control containing no siloxane. It is of course possible, however, that a person skilled in the art might wish, for a specific purpose, to decrease the percent reduction in the initial peel as compared to the control.

In some embodiments, the total weight of B and C monomers is within the range of 0.01 to 70% of the total weight of all monomers in the copolymer.

In some embodiments, the C monomer and certain of the reinforcing monomers, B, are terminally functional polymers having a single functional group (the vinyl group) and are sometimes termed macromonomers or "macromers". Such monomers are known and may be prepared by the method disclosed by Milkovich et al., as described in U.S. Pat. Nos. 3,786,116 and 3,842,059. The preparation of polydimethylsiloxane macromonomer and subsequent copolymerization with vinyl monomer have been described in several papers by Y. Yamashita et al., [Polymer J. 14, 913 (1982); ACS Polymer Preprints 25 (1), 245 (1984); Makromol. Chem. 185, 9 (1984)]. This method of macromonomer preparation involves the anionic polymerization of hexamethylcyclotrisiloxane monomer to form living polymer of controlled molecular weight, and termination is achieved via chlorosilane compounds containing a polymerizable vinyl group. Free radical copolymerization of the monofunctional siloxane macromonomer with vinyl monomer or monomers provides siloxane-grafted copolymer of well-defined structure, i.e., controlled length and number of grafted siloxane branches.

Preferred additives in the blend include copolymers with any of 93 to 78 parts by weight of 2-MBA, isooctyl acrylate, or 2-ethylhexyl acrylate, 2 to 10 parts by weight of acrylic acid or acrylamide, and 5-20 parts by weight of the polysiloxane monomer. Particularly preferred additives in the blend include copolymers with 83 parts by weight of isooctyl acrylate, 7 parts by weight of acrylic acid and 10 parts by weight of the polysiloxane monomer.

The amount of polysiloxane monomer in the adhesive composition may be controlled by varying the amount of the polysiloxane monomer in the additive, or by varying the amount of the additive in the blend. The adhesive composition includes less than 1% by weight, or less than 0.9% by weight, or less than 0.5% by weight, or 0.1% by weight of the polysiloxane monomer. The additive is typically present in the blend at greater than 0% and up to 50% by weight, or greater than 0% by weight and up to 30% by weight, or greater than 0% and up to 10% by weight, or greater than 0% by weight and up to 5% by weight.

The adhesive composition may optionally be crosslinked using methods known in the art, and the crosslinker and/or crosslinking technique may be selected depending on the adhesives and additives used. The degree of crosslinking may be selected based upon the application for which the article is intended. The adhesive composition may be crosslinked by any conventional technique including, for example, covalent, ionic or physical crosslinking. For example, covalent crosslinks may be formed by the use of ionizing radiation such as e-beam; by the use of ultraviolet radiation in the presence of a photoactive functional group such as benzophenone; or, by traditional reactive chemical means such as the reaction of a carboxylic acid group with an aziridine group. Ionic crosslinks may be formed by interaction of an acidic group and a basic group. Examples of physical crosslinks include high Tg polymer segments included, for example, thermoplastic elastomeric block copolymers. Such segments aggregate to form physical crosslinks that dissipate upon heating.

The adhesive composition may optionally include one or more additives such as initiators, fillers, plasticizers, tackifiers, chain transfer agents, fibrous reinforcing agents, foaming agents, antioxidants, stabilizers, fire retardants, viscosity modifying agents, coloring agents, and mixtures thereof.

The adhesive composition may be applied to major surface of a polymeric film to form a graphic article. The polymeric film used in the graphic article may vary widely depending on the intended application. Suitable films include polyesters, polyolefins polyacrylates, polyurethanes and vinyls. Typically, the films include plasticized polyvinyl chloride (PVC) with a thickness of about 2-4 mils (0.005 cm to 0.010 cm). Suitable films may have an imageable surface opposite the surface on which the adhesive is applied. The imageable surface may have an image applied by conventional printing techniques, including ink jet printing, screen printing, laser printing, electrostatic imaging, thermal mass transfer imaging and the like.

The adhesive composition may be applied to the polymeric film by any suitable coating technique, and typically forms a smooth and substantially continuous layer having a thickness of about 15-50 micrometers. The adhesive layer is typically covered by a release liner or transfer liner. The liner can be capable of being placed in intimate contact with an adhesive and subsequently removed without damaging the adhesive layer. Non-limiting examples of liners include materials from 3M of St. Paul, Minn., Loparex, Willowbrook Ill., P.S Substrates, Inc., Schoeller Technical Papers, Inc., AssiDoman Inncoat GMBH, and P. W. A. Kunstoff GMBH. For example, the liner can be paper, a clay coated paper, a polymer-coated paper with a release coating, a polyethylene coated polyethylene terepthalate (PET) film with release coatings, or a cast polyolefin film with a release coating.

The surface of the adhesive opposite the film may be smooth or may have a structured topography. If the adhesive has a structured topography, the surface of the adhesive layer can have specific shapes that allow egress of air or other fluids trapped at the interface between the adhesive and a substrate as the graphic article is applied. The microstructures allow the adhesive layer to be uniformly adhered to or laminated to a substrate without forming bubbles that could cause imperfections in the resulting laminate.

The microstructures on the adhesive layer (and corresponding microstructures on a release liner) can be microscopic in at least two dimensions. The term microscopic as used herein refers to dimensions that are difficult to resolve by the human eye without aid of a microscope. One useful definition of microscopic is found in Smith, Modern Optic Engineering, (1966), pages 104-105, wherein visual acuity is defined and measured in terms of the angular size of the smallest character that can be recognized. Normal visual acuity allows detection of a character that subtends an angular height of 5 minutes of arc on the retina.

The microstructures in the adhesive layer of the invention may be made as described in U.S. Pat. Nos. 6,197,397 and 6,123,890, which are each incorporated herein by reference. The topography may be created in the adhesive layer by any contacting technique, such as casting, coating or compressing. The topography may be made by at least one of: (1) casting the adhesive layer on a tool with an embossed pattern, (2) coating the adhesive layer onto a release liner with an embossed pattern, or (3) passing the adhesive layer through a nip roll to compress the adhesive against a release liner with an embossed pattern. The topography of the tool used to create the embossed pattern may be made using any known technique, such as, for example, chemical etching, mechanical etching, laser ablation, photolithography, stereolithography, micromachining, knurling, cutting or scoring.

A liner can be disposed on the microstructured adhesive layer and may be any release liner or transfer liner known to those skilled in the art that in some cases are able of being embossed as described above. The liner can be capable of being placed in intimate contact with an adhesive and subsequently removed without damaging the adhesive layer. Non-limiting examples of liners include materials from 3M of St. Paul, Minn., Loparex, Willowbrook Ill., P.S Substrates, Inc., Schoeller Technical Papers, Inc., AssiDoman Inncoat GMBH, and P. W. A. Kunstoff GMBH. The liner can be a polymer-coated paper with a release coating, a polyethylene coated polyethylene terepthalate (PET) film with release coatings, or a cast polyolefin film with a release coating.

The adhesive layer and/or release liner may optionally include additional non-tacky microstructures, including any of pegs, particles and beads such as, for example, those described in U.S. Pat. Nos. 5,296,277; 5,362,516; and 5,141,790. An example of such microstructured adhesive layers with non-tacky microstructures includes those available from 3M. St. Paul, Minn., under the trade designation Controltac Plus.

The microstructures may form a regular or a random array or pattern. Regular arrays or patterns include, for example, rectilinear patterns, polar patterns, cross-hatch patterns, cube-corner patterns. The patterns may be aligned with the direction of the carrier web, or may be aligned at an angle with respect to the carrier web. The pattern of microstructures may optionally reside on both major, opposing surfaces of the adhesive layer. This allows individual control of air egress and surface area of contact for each of the two surfaces to tailor the properties of the adhesive to two different interfaces.

The pattern of microstructures can define substantially continuous open pathways or grooves that extend into the adhesive layer from an exposed surface. The pathways either terminate at a peripheral portion of the adhesive layer or communicate with other pathways that terminate at a peripheral portion of the article. When the article is applied to a substrate, the pathways allow egress of fluids trapped at an interface between the adhesive layer and a substrate.

The shapes of the microstructures in the adhesive layer may vary widely depending on the level of fluid egress and peel adhesion required for a particular application, as well as the surface properties of the substrate. Protrusions and depressions may be used, and in some embodiments the microstructures may be continuous grooves in the adhesive layer. Suitable shapes include hemispheres, V-grooves, and pyramids such as, for example, right pyramids, trigonal pyramids, square pyramids, quadrangle pyramids, and truncated pyramids. The shapes may be selected for reasons such as, for example, pattern density, adhesive performance, and readily available methodology for producing the microstructures. The microstructures may be systematically or randomly generated.

Figure 1:
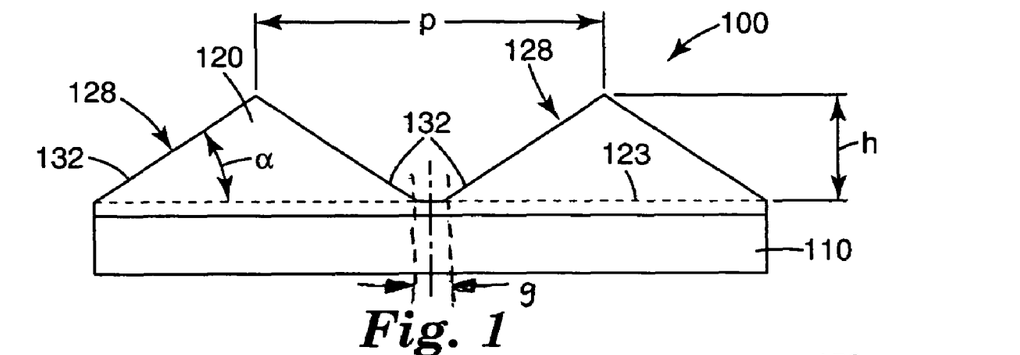
FIG. 1 is a schematic cross-sectional view of a microstructured adhesive on an graphic article.

FIG. 1 is a schematic cross-sectional view of a microstructured adhesive 120 on a film 110, which forms a graphic article 100. The graphic article 100 is preferably translucent, opaque or retroreflective. A translucent graphic article transmits visible light, may optionally be colored, and is not necessarily optically clear. An opaque graphic article substantially blocks visible light transmission. A retroreflective graphic article reflects light preferentially back toward its source, and suitable examples include those available from 3M, St. Paul, Minn. under the trade designation SCOTCHLITE.

Referring again to FIG. 1, the embodiment shown has a plurality of pyramidal protrusions 128 extending above a plane 123 of the adhesive layer 120. The dimensions of the protrusions may vary widely depending on the rheology of the adhesive layer and the application conditions, and should be selected to provide adequate balance between adhesion to substrate and fluid egress. In some embodiments, the mean pitch, p, between selected protrusions 128 is up to 400 micrometers, or 50 to 400 micrometers, or from 100 to 350 micrometers, or from 180 to 300 micrometers. In some embodiments, the mean height, h, of selected protrusions 128 from the plane 123 of the adhesive layer 120 can be greater than 1 micrometer and up to 35 micrometers, or 5 to 30 micrometers, or 10 to 25 micrometers. Selected protrusions 128 have at least one sidewall 132 that makes an angle α with respect to a plane 123 of the surface of the adhesive layer 120. The angle α can be selected from an angle greater than 5° and less than 40°, or from 5° to 15°, or from 5° to 10°. The gap between structures, g, is typically about 0% to about 50% of the pitch p.

An optional release liner (not shown in FIG. 1) can be disposed on the adhesive layer 120. The release liner can have a topography that corresponds to the topography of the adhesive layer 120. In some embodiments, the release liner can provide a low surface energy interface with the adhesive 120 which can allow siloxane moieties present in the adhesive 120 to concentrate at or near the surface interface with the release liner.

Figure 2:
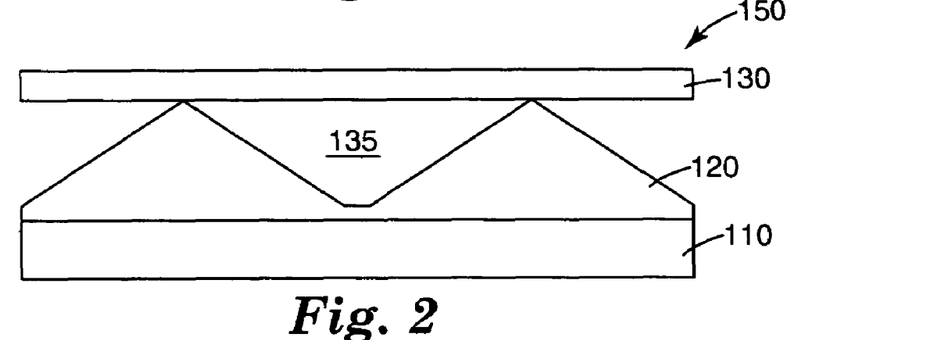
FIG. 2 is a schematic cross-sectional view of the microstructured adhesive on the graphic article of FIG. 1 as it is contacted with a substrate.

Once the release liner is removed, the exposed surface of the microstructured adhesive layer 120 may be contacted with a substrate 130 to form a composite laminate 150, which may be a conventional graphic or a front lit or back lit sign. FIG. 2 is a schematic cross-sectional view of the adhesive 120 and substrate 110 of FIG. 1 as it contacts a substrate 130 to form a composite laminate 150.

The substrates 130 may be rigid or flexible. Examples of suitable substrates 130 include glass, metal, plastic, wood, and ceramic substrates, painted surfaces of these substrates, and the like. Representative plastic substrates include polyester, polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. For example, to make a backlit sign, a suitable substrate is a flexible translucent plastic material available from 3M, St. Paul, Minn., under the trade designation PANAFLEX. The substrate 130 may also be a woven fabric formed from threads of synthetic or natural materials such as, for example, cotton, nylon, rayon, glass or ceramic material. The substrate 130 may also be made of a nonwoven fabric such as air laid webs of natural or synthetic fibers or blends thereof.

The process of applying the graphic article to a substrate is preferably substantially dry. For the purposes of this application, substantially dry means that liquid application aids are not required to provide acceptable properties such as, for example, any or all of self-adhesion, initial adhesion to the substrate, slideability and repositionability on the substrate, air/liquid egress, and final adhesion and wetout properties on the substrate.

As an example of this process, referring to FIG. 2, as the adhesive layer 120 initially contacts a substrate 130, the pyramidal protrusions 128 contact the surface of the substrate 130, and the areas 135 between the protrusions 128 function as channels for fluid egress. This allows pockets of trapped air between the adhesive layer 120 and the substrate 130 to be easily transported to an adhesive edge.

After removal of the protective release liner, the microstructures on the surface of the adhesive layer retain their shape for a sufficient time to maintain the fluid egress properties of the adhesive layer. The selection of the adhesive also plays a role in determining the long-term properties of the adhesive layer. After pressure is applied, the microstructures on the adhesive layer may optionally collapse and increase the amount of adhesive in contact with the substrate.

Figure 3:
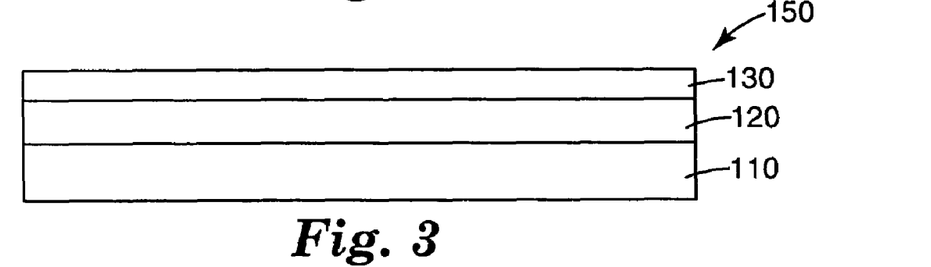
FIG. 3 is a schematic cross-sectional view of the microstructured adhesive on the graphic article of FIG. 1 after dry lamination to the substrate.

Referring to FIG. 3, in some embodiments, after adequate application consistent with techniques known in the art, the channels 135 (shown in FIG. 2), if present, can at least partially disappear to provide the desired adhesion to the substrates 130.

Advantages of the invention are illustrated by the following examples. However, the particular materials and amounts thereof recited in these examples, as well as other conditions and details, are to be interpreted to apply broadly in the art and should not be construed to unduly limit the invention.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis., unless otherwise noted.

| Table of Abbreviations | |
|---|---|
| Abbreviation or Trade Designation | Description |
| Additive-1 | A silicone modified polymer of 83 parts by weight of iso-octyl acrylate, 7 parts by weight of acrylic acid, and 10 parts by weight of polysiloxane monomer as described in U.S. Pat. No. 4,693,935 Example 36. This polymer was prepared and used as a 28.77% by weight solution in ethyl acetate, isopropyl alcohol, and heptane. |
| PSA-1 | A copolymer of 90 parts by weight of 2-methylbutyl acrylate and 10 parts by weight of acrylic acid. This polymer was prepared and used as a 40% by weight solution in heptane/acetone (65:35). |
| Crosslinker-1 | 5% solids solution in toluene of the crosslinker described in Example 1 of U.S. Pat. No. 5,296,277. |
| Film-1 | Nominally 50 micrometer thick plasticized, white flexible and conformable vinyl (PVC, polyvinyl chloride). |
| Film-2 | Nominally 50 micrometer thick plasticized, yellow translucent and conformable vinyl (PVC, polyvinyl chloride). |
| Acrylic Substrate | Clear acrylic plastic sheet, about 3 millimeters thick available under the trade name PLEXIGLAS. The sheet was washed with isopropyl alcohol and allowed to air dry. |
| Liner-1 | Flat clay-coated paper liner having a thin silicone release layer. |
| Liner-2 | Polyolefin coated paper liner having a thin silicone release layer and having a topography of side-adjacent square pyramidal recesses at a repeat pitch of about 200 micrometers, depth of about 15 micrometers, sidewall slopes of about 8 degrees from horizontal. |
| Liner-3 | Polyolefin coated paper liner having a thin silicone release layer and having a topography of recessed side-adjacent square pyramidal features at a repeat pitch of about 292 micrometers, gap between recessed features of about 6 micrometers, depth of about 25 micrometers, and sidewall slopes of about 10 degrees from horizontal. |
| Liner-4 | Polyolefin coated paper liner having a thin silicone release layer and having a topography of side-adjacent square pyramidal recesses at a repeat pitch of about 197 micrometers, depth of about 15 micrometers, sidewall slopes of about 8 degrees from horizontal. The topography included a second pattern of a grid array at a repeat pitch of about 400 micrometers of small circular recessed pits The pits were about 50 micrometers in diameter, about 13 micrometers deep, and filled with non-tacky ceramic beads. |

-continued

Table of Abbreviations

| Abbreviation or Trade Designation | Description |
|---|---|
| Laminate-1 | Available from 3M Company, St. Paul, MN under the trade name 3630 Series SCOTCHCAL Marking Film. |

Test Methods

Self Adhesion Test

Liner was removed from the adhesive face of about a 15 centimeter long×10 centimeter wide film sample. The film sample was held adhesive face up at the two lengthwise ends with two hands while the film was allowed to fold and hang loosely in between. The end edges were carefully brought closer together to allow the two vertically hanging adhesive faces of the film to gently contact each other, and then the two ends were pulled apart to separate the contacting adhesive faces. The extent of grab of the adhesive faces while separating them was recorded: difficult to separate—grab; very slight self adhesion and very easy to separate—slight grab; essentially no self adhesion—no grab.

Slidability Test

Liner was removed from the adhesive face of about a 15 centimeter long×10 centimeter wide film sample, and at room temperature the adhesive face of the sample was allowed to contact the smooth glass or Acrylic Substrate panel under gravitational force. One lengthwise edge of the sample was held and pulled essentially horizontally to the panel. The ease of slidability was recorded: essentially no slide—slight; difficult to slide—limited; easily slides—OK; very easy to slide—excellent.

Air Bleed

Air bubble release was evaluated by applying the adhesive face of about a 15 centimeter long×10 centimeter wide film backing/PSA laminate sample onto a flat, smooth panel, applying finger pressure from edges toward center to entrap some bubbles, and pressing at edges of bubbles to attempt to flatten graphic against panel. Results are listed as "Yes" or "No" if air bubbles are released or not.

Wetout Test

Using the pan of an electronic balance, the adhesive face of a film sample was applied onto a panel of the Acrylic Substrate using finger pressure to register about 500 g. on the balance. After about 5 minutes and after 24 hours at room temperature, the adhesive interface with the Acrylic Substrate was viewed through the panel from the opposite face of the panel using microscopy, and the percentage area of adhesive contact was determined using image analysis.

180° Peel Adhesion

Samples were cut into 2.54 centimeter wide strips. The release liner was removed and the adhesive face of the film strip was adhered to the clean Acrylic Substrate using a PA-1 plastic squeegee (available from 3M) and firm application force. After the indicated dwell time, the sample was tested for 180° peel adhesion using an Instron Model 5564 universal testing machine at a rate of 30 centimeters/minute (12 inches/minute). Five samples were tested for each condition, and the reported adhesion value is an average of the five samples.

Example 1

A mixture of the solutions of Additive-1, PSA-1, and Crosslinker-1 was prepared to give 1 part by weight solids Additive-1, 99 parts by weight solids PSA-1, and 0.15 parts by weight solids Crosslinker-1, coated onto Liner-2 with a notch bar coater at a gap of about 125 micrometers, and dried in an oven at 70° C. for 10 minutes. Film-1 was laminated to this construction. Liner-2 was removed and the adhesive coated film was tested for Self Adhesion Test, Slidability Test, Air Bleed Test, and Wetout Test. The results are shown in Table 1.

Example 2

A mixture of the solutions of Additive-1, PSA-1, and Crosslinker-1 was prepared to give 5 part by weight solids Additive-1, 95 parts by weight solids PSA-1, and 0.13 parts by weight solids Crosslinker-1, coated onto Liner-2 with a notch bar coater at a gap of about 76 micrometers, and dried in an oven at 70° C. for 10 minutes. Film 2 was laminated to this construction. Liner-2 was removed and the adhesive coated film was tested for Self Adhesion Test, Slidability Test, Air Bleed Test, and Wetout Test. The results are shown in Table 1.

Example 3

A mixture of the solutions of Additive-1, PSA-1, and Crosslinker-1 was prepared to give 10 part by weight solids Additive-1, 90 parts by weight solids PSA-1, and 0.15 parts by weight solids Crosslinker-1, coated onto Liner-2 with a notch bar coater at a gap of about 125 micrometers, and dried in an oven at 70° C. for 10 minutes. Film-1 was laminated to this construction. Liner-2 was removed and the adhesive coated film was tested for Self Adhesion Test, Slidability Test, Air Bleed Test, and Wetout Test. The results are shown in Table 1.

Comparative Example C1

A mixture of the solutions of PSA-1 and Crosslinker-1 was prepared to give 100 parts by weight solids PSA-1 and 0.14 parts by weight solids Crosslinker-1, coated onto Liner-1 with a notch bar coater at a gap of about 76 micrometers, and dried in an oven at 70° C. for 10 minutes. Film-2 was laminated to this construction. Liner-1 was removed and the adhesive coated film was tested for Self Adhesion Test, Slidability Test, Air Bleed Test, and Wetout Test. The results are shown in Table 1.

Comparative Example C2

Comparative Example C1 was repeated, but used Liner-2. Liner-2 was removed and the adhesive coated film was tested for Self Adhesion Test, Slidability Test, Air Bleed Test, and Wetout Test. The results are shown in Table 1.

Example 4

A mixture of the solutions of Additive-1, PSA-1, and Crosslinker-1 was prepared to give 1 part by weight solids Additive-1, 99 parts by weight solids PSA-1, and 0.15 parts by weight solids Crosslinker-1, coated onto Liner-3 with a notch bar coater at a gap of about 125 micrometers, and dried in an oven at 70° C. for 10 minutes. Film-1 was laminated to this construction. Liner-3 was removed and the adhesive coated film was tested for Self Adhesion Test, Slidability Test, Air Bleed Test, and Wetout Test. The results are shown in Table 1.

Example 5

A mixture of the solutions of Additive-1, PSA-1, and Crosslinker-1 was prepared to give 5 part by weight solids Additive-1, 95 parts by weight solids PSA-1, and 0.15 parts by weight solids Crosslinker-1, coated onto Liner-3 with a notch bar coater at a gap of about 125 micrometers, and dried in an oven at 70° C. for 10 minutes. Film-1 was laminated to this construction. Liner-3 was removed and the adhesive coated film was tested for Self Adhesion Test, Slidability Test, Air Bleed Test, and Wetout Test. The results are shown in Table 1.

Example 6

A mixture of the solutions of Additive-1, PSA-1, and Crosslinker-1 was prepared to give 10 part by weight solids Additive-1, 90 parts by weight solids PSA-1, and 0.15 parts by weight solids Crosslinker-1, coated onto Liner-3 with a notch bar coater at a gap of about 125 micrometers, and dried in an oven at 70° C. for 10 minutes. Film-1 was laminated to this construction. Liner-3 was removed and the adhesive coated film was tested for Self Adhesion Test, Slidability Test, Air Bleed Test, and Wetout Test. The results are shown in Table 1.

Comparative Example C3

A mixture of the solutions of PSA-1 and Crosslinker-1 was prepared to give 100 parts by weight solids PSA-1 and 0.14 parts by weight solids Crosslinker-1, coated onto Liner-3 with a notch bar coater at a gap of about 125 micrometers, and dried in an oven at 70° C. for 10 minutes. Film-1 was laminated to this construction. Liner-3 was removed and the adhesive coated film was tested for Self Adhesion Test, Slidability Test, Air Bleed Test, and Wetout Test. The results are shown in Table 1.

Example 7

A mixture of the solutions of Additive-1, PSA-1, and Crosslinker-1 was prepared to give 5 part by weight solids Additive-1, 95 parts by weight solids PSA-1, and 0.13 parts by weight solids Crosslinker-1, coated onto Liner-4 with a notch bar coater at a gap of about 76 micrometers, and dried in an oven at 75° C. for 15 minutes. Film-2 was laminated to this construction. Liner-4 was removed and the adhesive coated film was tested for Self Adhesion Test, Slidability Test, Air Bleed Test, and Wetout Test. The results are shown in Table 1. A modified Wetout Test was performed using an application procedure that used a PA-1 plastic squeegee (available from 3M) and firm application force, which gave an initial wetout of 80% and a 24 hour dwell wetout of 97%.

TABLE 1

| Example | Self Adhesion Test | Slidability Test | Air Bleed Test | Wet out Initial | Wet out After 24 hours |
|---|---|---|---|---|---|
| 1 | Slight grab | OK | Yes | NM | NM |
| 2 | Slight grab | OK | Yes | 59 | 95 |
| 3 | Slight grab | OK | Yes | NM | NM |
| C1 | Grab | Slight | No | 78 | 99 |
| C2 | Grab | Limited | Yes | 59 | 95 |
| 4 | Slight grab | Excellent | Yes | NM | 34 |
| 5 | No grab | Excellent | Yes | NM | 31 |
| 6 | No grab | Excellent | Yes | NM | 50 |
| C3 | grab | Limited | Yes | NM | 34 |
| 7 | No grab | Excellent | Yes | 53-58 | 94 |
| 8 | Slight grab | Slight | No | NM | NM |

NM = Not Measured

Example 8

A mixture of the solutions of Additive-1, PSA-1 and Crosslinker-1 was prepared to give 5 parts by weight Additive-1, 95 parts by weight solids PSA-1, and 0.14 parts by weight solids Crosslinker-1, coated into Liner-1 with a notch bar coater at a gap of about 125 micrometers, and dried in an oven at 66° C. for 15 minutes. Film-2 was laminated to this construction. Liner-1 was removed and the adhesive coated film was tested using the Self Adhesion Test, Slidability Test, and Air Bleed Test. The results are shown in Table 1.

Example 9 and Comparative Example C4

For Example 9, samples of the adhesive/liner constructions prepared in Examples 2, 5, and 7 were laminated to an Acrylic Substrate and tested for 180° Peel Adhesion according to the Test Method given above after dwells of 0 hours (initial), 0.5, 1, 2, and 6 hours and after 5 days at 23° C. and 50% relative humidity. All samples were applied dry using firm pressure from a PA-1 plastic squeegee. For Comparative Example C4, Laminate-1 was applied either using an aqueous detergent solution (as per product instructions) called wet lamination or dry as for Example 9. These data are shown in Table 2.

TABLE 2

| Example | Example Reference | Lamination Method | 180° Peel Adhesion Initial (N/dm) | 180° Peel Adhesion 0.5 hour (N/dm) | 180° Peel Adhesion 1 hour (N/dm) | 180° Peel Adhesion 2 hours (N/dm) | 180° Peel Adhesion 6 hours (N/dm) | 180° Peel Adhesion 5 days (N/dm) |
|---|---|---|---|---|---|---|---|---|
| 9A | 2 | Dry | 35 | 42 | 42 | 46 | 46 | 56 |
| 9B | 5 | Dry | 28 | 32 | 37 | 39 | 40 | 44 |
| 9C | 7 | Dry | 33 | 35 | 33 | 37 | 42 | 67 |
| C4A | — | Wet | NM | 1.1 | 11 | 26 | 58 | 54 |
| C4B | — | Dry | 56 | 61 | 67 | 67 | 67 | 74 |

NM = Not Measured

The complete disclosure of all patents, patent documents, and publications cited herein are incorporated be reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. An article comprising a polymeric film having thereon a layer of an adhesive composition, wherein the adhesive composition comprises a blend of: a pressure sensitive adhesive comprising a (meth)acrylate polymer; and, an additive comprising a copolymer, wherein the copolymer comprises: a vinyl polymeric backbone comprising a at least one free radically polymerizable vinyl monomer A and at least one reinforcing comonomer B, wherein B is present at up to about 20% by weight of the copolymer, and a pendant polysiloxane monomer grafted to the backbone, wherein the polysiloxane monomer is present at 0.01 to 50% by weight of the copolymer, and wherein the polysiloxane monomer has a number average molecular weight of 500 to 50,000; and wherein the blend comprises greater than zero and less than 1% by weight of the polysiloxane monomer, wherein the adhesive layer has a microstructured surface.

2. The article of claim 1, wherein the adhesive composition further comprises a crosslinker.

3. The article of claim 1, wherein the polymeric film is translucent, retroreflective or opaque.

4. The article of claim 1, further comprising a release liner on the adhesive layer.

5. The article of claim 1, wherein the microstructured surface comprises an array of pyramidal projections, wherein the projections extend away from the film.

6. The article of claim 5, wherein the projections in array have a mean pitch of 180-300 micrometers, a mean height of 10 to 25 micrometers, and sidewall slopes of 5-10°.

7. The article of claim 1, further comprising on the adhesive layer at least one of non-tacky pegs or beads.

* * * * *